(12) United States Patent
Gomez et al.

(10) Patent No.: US 7,804,656 B2
(45) Date of Patent: *Sep. 28, 2010

(54) LIGHT DELIVERY TECHNIQUE FOR HEAT ASSISTED MAGNETIC RECORDING HEAD

(75) Inventors: Kevin Arthur Gomez, Wexford, PA (US); William Albert Challener, Sewickley, PA (US); Ravishankar Ajjanagadde Shivarama, Bloomington, MN (US); Patrick Breckow Chu, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 12/026,683

(22) Filed: Feb. 6, 2008

(65) Prior Publication Data

US 2008/0123219 A1 May 29, 2008

Related U.S. Application Data

(62) Division of application No. 10/854,564, filed on May 26, 2004, now Pat. No. 7,345,840.

(51) Int. Cl.
*G11B 7/135* (2006.01)
*G11B 5/60* (2006.01)
(52) U.S. Cl. .............. 360/59; 369/300; 369/112.27; 720/662
(58) Field of Classification Search .............. 360/59; 369/300, 112.27; 720/662
See application file for complete search history.

(56) References Cited

U.S. PATENT DOCUMENTS

| | | | |
|---|---|---|---|
| 5,199,090 A | 3/1993 | Bell | |
| 6,181,673 B1 * | 1/2001 | Wilde et al. | 369/300 |
| 6,404,706 B1 * | 6/2002 | Stovall et al. | 369/13.17 |
| 6,538,974 B2 * | 3/2003 | Wilde et al. | 369/112.01 |
| 6,549,506 B1 * | 4/2003 | Johnson et al. | 369/222 |
| 2001/0050828 A1 | 12/2001 | Davis et al. | |
| 2001/0055264 A1 * | 12/2001 | Cheong et al. | 369/112.23 |
| 2003/0007292 A1 * | 1/2003 | Himes et al. | 360/245.9 |
| 2003/0026038 A1 | 2/2003 | Zeng et al. | |
| 2003/0043699 A1 * | 3/2003 | Isshiki et al. | 369/13.33 |
| 2003/0103440 A1 | 6/2003 | Kim | |
| 2003/0128474 A1 * | 7/2003 | Schulz et al. | 360/245.9 |
| 2003/0128633 A1 | 7/2003 | Batra et al. | |
| 2004/0001420 A1 | 1/2004 | Challener | |
| 2004/0008591 A1 | 1/2004 | Johns et al. | |
| 2004/0012889 A1 * | 1/2004 | Hernandez et al. | 360/245.9 |
| 2004/0062503 A1 * | 4/2004 | Challener | 385/129 |

FOREIGN PATENT DOCUMENTS

| | | |
|---|---|---|
| WO | WO0188906 A2 | 11/2001 |
| WO | WO03023768 A1 | 3/2003 |

* cited by examiner

*Primary Examiner*—Brian E Miller
(74) *Attorney, Agent, or Firm*—Robert P. Lenart, Esq.; Pietragallo Gordon Alfano Bosick & Raspanti, LLP

(57) ABSTRACT

An apparatus includes a load beam, a slider coupled to the load beam by a gimbal assembly and including an optical transducer, an optical fiber for transmitting light directly toward the transducer, and a mounting structure for adjusting the position of an end of the optical fiber. Data storage devices that include the apparatus are also included.

20 Claims, 6 Drawing Sheets

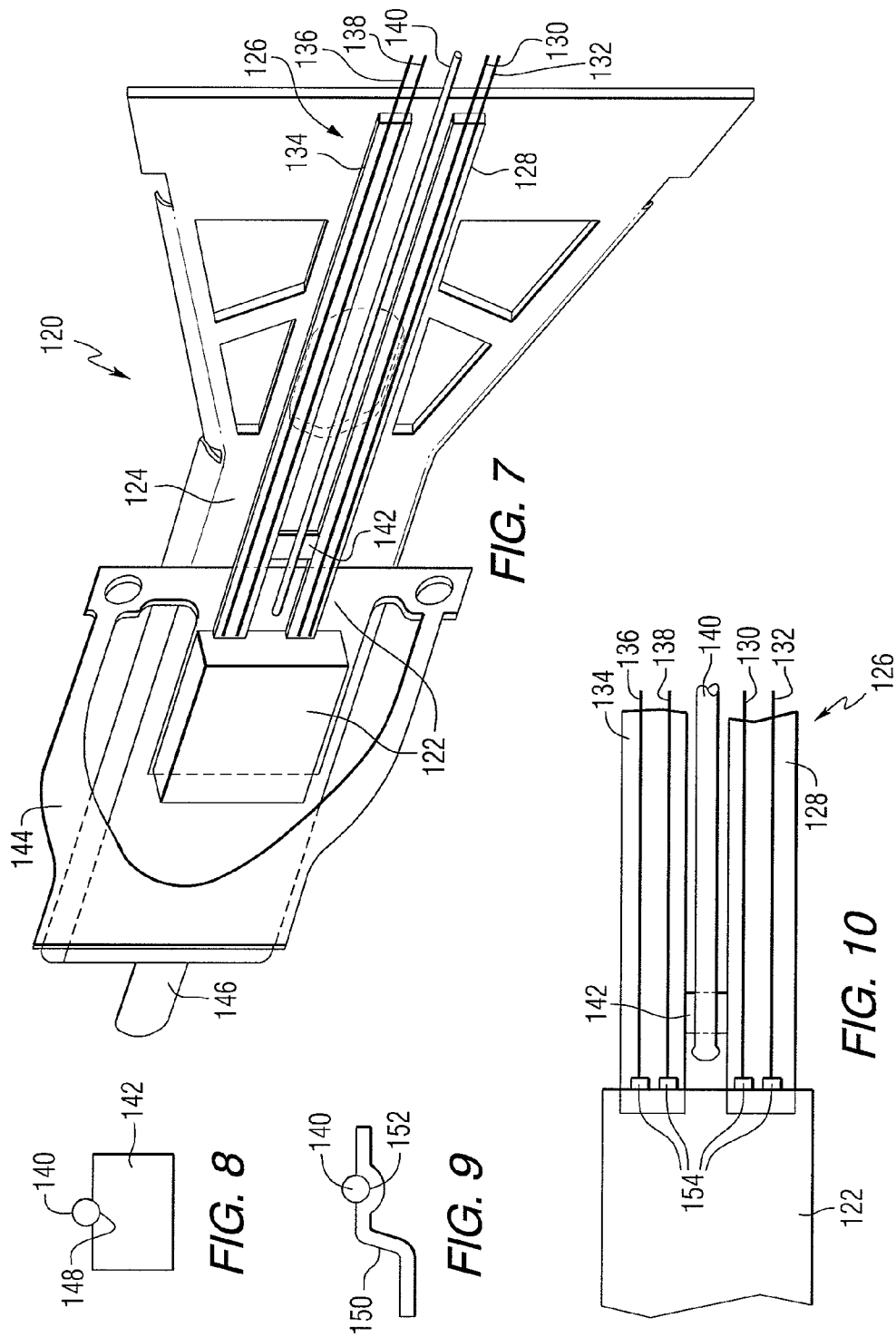

LIGHT DELIVERY TECHNIQUE FOR HEAT ASSISTED MAGNETIC RECORDING HEAD

CROSS REFERENCE TO RELATED APPLICATION

This application is a divisional application of U.S. patent application Ser. No. 10/854,564, filed May 26, 2004, and titled "Light Delivery Technique For Heat Assisted Magnetic Recording Head", which is hereby incorporated by reference.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to data storage devices, and more particularly to such devices that can be used in optical recording and thermally assisted magnetic recording.

BACKGROUND OF THE INVENTION

In thermally assisted optical/magnetic data storage, information bits are recorded on a layer of a storage medium at elevated temperatures, and the heated area in the storage medium determines the data bit dimension. Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. For heat assisted magnetic recording (HAMR) a tightly confined, high power laser light spot is used to preheat a portion of the recording medium to substantially reduce the coercivity of the heated portion. Then the heated portion is subjected to a magnetic field that sets the direction of magnetization of the heated portion. In this manner the coercivity of the medium at ambient temperature can be much higher than the coercivity during recording, thereby enabling stability of the recorded bits at much higher storage densities and with much smaller bit cells. Heat assisted magnetic recording can be applied to any type of magnetic storage media, including tilted media, longitudinal media, perpendicular media and patterned media.

In HAMR disc drives, it is desirable to efficiently deliver the laser light to the recording head. One approach would be to place a laser source directly on the slider. However, that approach requires additional electrical connections to the slider for the laser. Also, the electrical power dissipated by the laser will substantially heat the slider, which is undesirable for obtaining the best performance from the reader. The added mass of the laser on the slider (or suspension assembly) may also degrade the dynamic and shock performance of the suspension.

Alternatively, a laser source can be located elsewhere in the disc drive and its emitted light carried to the slider through an optical fiber. This approach eliminates the problems with the laser on the slider mentioned above, but introduces a new problem, which is how the optical connection is made between the fiber and the slider. Optical fiber is typically very stiff. If the fiber is physically attached to the slider, the stiffness complicates the design of the gimbal structure which allows the slider to fly over the surface of the disc. Therefore, it is desirable to have a small free space gap between the end of the fiber and the slider. The fiber should be brought to the slider along the suspension and then positioned so that the emitted light illuminates the optical transducer on the slider. One way that has been proposed to do this is to include a mirror or prism on the suspension to direct the laser beam toward the slider.

There is a need for a recording device that can provide localized heating of a recording medium without the need for mirrors, multiple optical components or sharp bends in an optical fiber.

SUMMARY OF THE INVENTION

In one aspect, the invention provides an apparatus including a load beam, a slider coupled to the load beam by a gimbal assembly and including an optical transducer, an optical fiber for transmitting light directly toward the transducer, and a mounting structure for adjusting the position of an end of the optical fiber.

In another aspect, the invention provides an apparatus including a motor for rotating a storage medium, a suspension arm including a load beam for positioning an optical transducer adjacent to a surface of the storage medium, a slider coupled to the load beam by a gimbal assembly and including the optical transducer, an optical fiber for transmitting light directly toward the optical transducer, and a mounting structure for adjusting the position of the end of the optical fiber.

BRIEF DESCRIPTION OF THE DRAWINGS

FIG. 7 is an isometric view of a suspension arm and slider constructed in accordance with this invention.

FIG. 8 is a side view of a block for supporting an optical fiber.

FIG. 9 is a side view of a tab for supporting an optical fiber.

FIG. 10 is a top view of a slider and a portion of a flex on suspension.

DETAILED DESCRIPTION OF THE INVENTION

Figure 1:
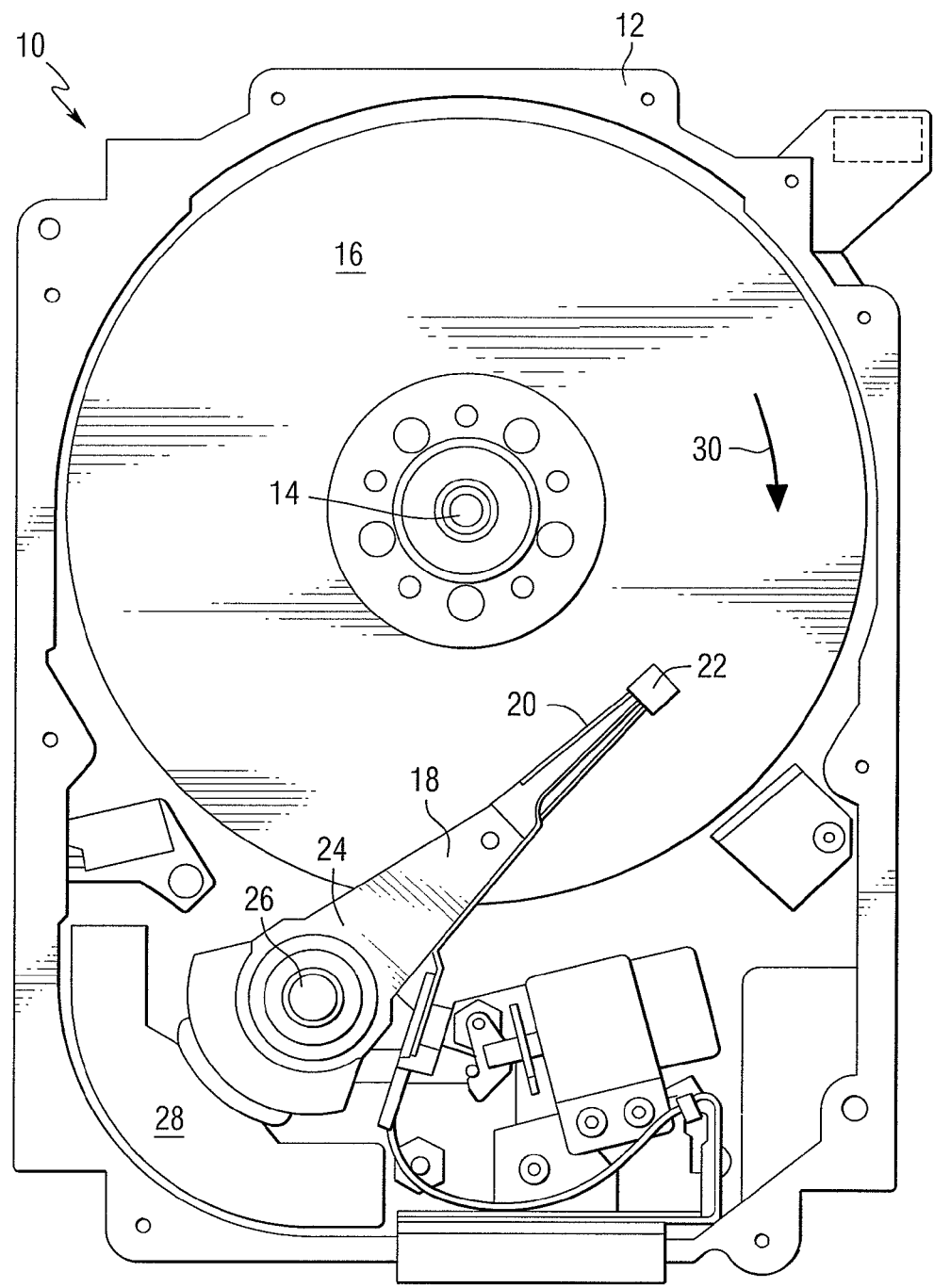
FIG. 1 is a pictorial representation of a disc drive including a suspension arm constructed in accordance with this invention.

This invention encompasses various devices used for heat assisted magnetic recording. FIG. 1 is a pictorial representation of a disc drive 10 including a suspension arm constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 about a pivot point to position the head 22 over a desired sector of the disc 16. The actuator motor 28 is regulated by a controller that is not shown in this view and is well-known in the art. The storage medium rotates in the direction indicated by arrow 30. As the disc rotates, the slider flies over the disc surface on an air bearing. The slider is positioned at the upstream end of the arm.

For heat assisted magnetic recording (HAMR), an electromagnetic wave of, for example, visible, infrared or ultraviolet light is directed onto a surface of a data storage medium to raise the temperature of a localized area of the medium to facilitate switching of the magnetization of the area. Recent designs of HAMR recording heads include a thin film waveguide on a slider to guide light to the storage medium for localized heating of the storage medium. To launch light into the waveguide, a grating coupler can be used.

Figure 2:
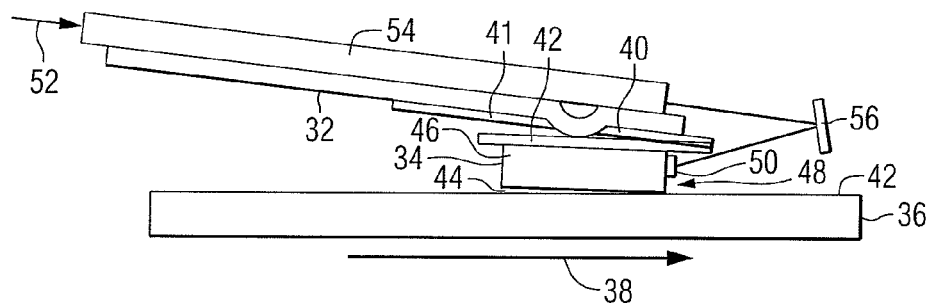
FIG. 2 is a schematic representation of a known arrangement of a slider and a portion of a suspension arm.

FIG. 2 is a schematic representation of a portion of a suspension arm 32 and slider 34 as is known in the art, in combination with a magnetic recording disc 36. During writing and/or reading of data, the disc moves relative to the slider in a direction indicated by arrow 38. The slider is coupled to the suspension arm by a gimbal assembly 40 positioned adjacent to a surface 42 of the disc and separated from the surface of the disc by an air bearing 44. The gimbal assembly includes a first portion 41 connected to the suspension arm 32 and a second portion 42 connected to the slider 34. The second portion is cantilevered to the first portion. The slider has a leading, or front, end 46 and a trailing, or back, end 48. The leading end faces toward the pivot point of the suspension arm and the trailing end faces away from the pivot point of the suspension arm. The slider includes an optical transducer 50 mounted adjacent to the trailing end. A laser produces a beam of light illustrated by arrow 52 that is transmitted toward the slider by an optical fiber 54. A mirror 56 is mounted at the end of the suspension arm to reflect the light toward the optical transducer. The fiber is attached to the suspension arm and terminates before the end of the suspension. The prism or mirror directs the output from the fiber onto the transducer on the slider. Additional lenses are almost certainly necessary to maintain a small beam diameter. The disadvantages of this technique include the additional expense of the prisms, lenses and mirrors, additional mass and windage, and the difficulty of aligning the microoptics and maintaining alignment as the slider flies on the disc and moves slightly relative to the suspension.

Figure 3:
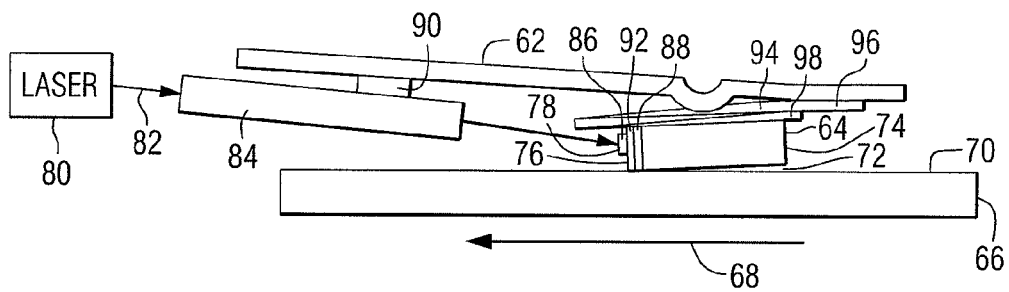
FIG. 3 is a schematic representation of a slider and a portion of a suspension arm constructed in accordance with this invention.

FIG. 3 is a schematic representation of a portion of a suspension arm 62 and slider 64 constructed in accordance with this invention, in combination with a magnetic recording disc 66. During writing and/or reading of data, the disc moves relative to the slider in a direction indicated by arrow 68. The slider is positioned adjacent to a surface 70 of the disc and separated from the surface of the disc by an air bearing 72. The slider has a leading end 74, also called a front or distal end, and a trailing end 76, also called a back or proximal end. The leading end faces away from, and is therefore distal to, the pivot point of the suspension arm and the trailing end faces toward, and is therefore proximal to, the pivot point of the suspension arm. The slider includes an optical transducer 78 mounted adjacent to the trailing end. A source of electromagnetic radiation, such as a laser 80, produces a beam of light illustrated by arrow 82 that is delivered to the optical transducer 78 by an optical fiber 84. The optical fiber 84 is supported by block 90 that is mounted on the suspension arm. The optical transducer can include a grating coupler 86 for coupling the light into the transducer. The optical transducer can further include a planar waveguide 92 for transmitting light to the air bearing surface of the slider. The light is then coupled to the surface of the disc to raise the temperature of a portion of the surface of the disc. The slider further includes a magnetic recording head 88 for producing a magnetic field that is used to affect the magnetization of the storage medium. A read head can also be included.

The slider is connected to the suspension arm 62 by a gimbal assembly 94. The gimbal assembly includes a first portion 96 connected to the suspension arm 62 and a second portion 98 connected to the slider 64. The second portion is cantilevered to the first portion. The gimbal assembly of FIG. 3 is reversed when compared to the gimbal assembly of FIG. 2. However, in another example, the gimbal assembly 94 of FIG. 3 could be replaced with the gimbal assembly 40 of FIG. 2.

The optical transducer can include a planar waveguide including a core layer for transmitting electromagnetic radiation and a cladding layer positioned adjacent to the core layer.

Figure 4:
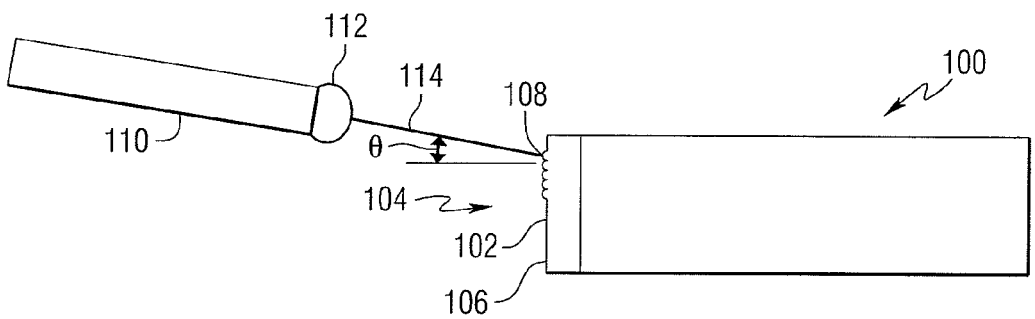
FIG. 4 is a schematic representation of a slider and a portion of an optical fiber constructed in accordance with this invention.

FIG. 4 is a schematic representation of a slider 100 constructed in accordance with this invention. An optical transducer 102 is positioned adjacent to the trailing end (back or proximal) 104 of the slider. The transducer includes a guiding core layer 106 and a grating coupler 108. An optical fiber 110, having a ball lens 112 is positioned to deliver light to the transducer as indicated by arrow 114. The angle of incidence of the light is defined as θ measured from the normal to the surface of the slider.

Figure 5:
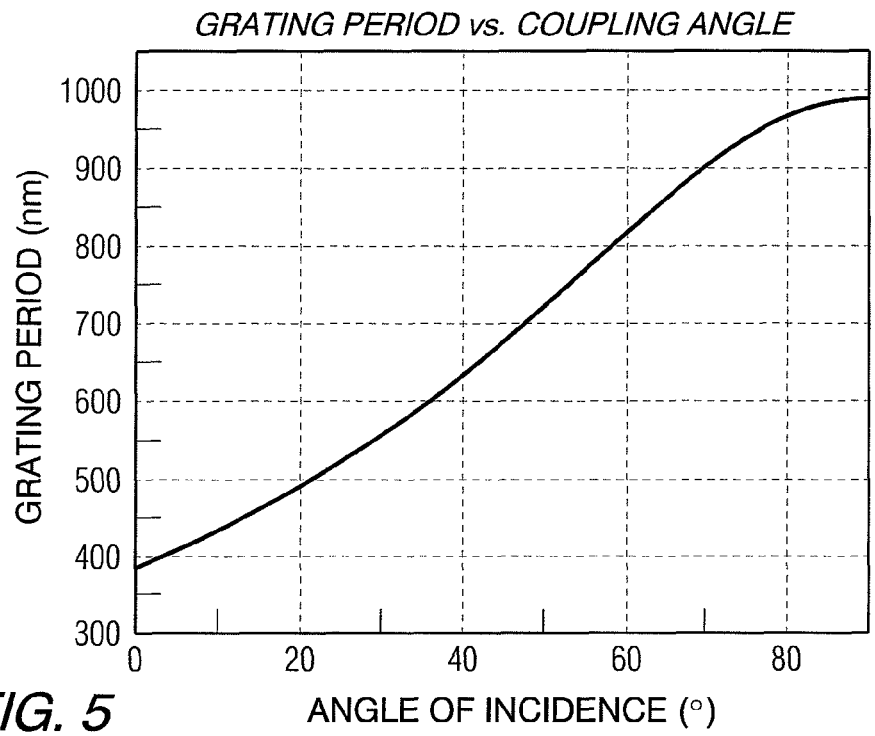
FIG. 5 is a graph of grating period versus angle of incidence.

FIG. 5 is a graph of the grating period versus angle of incidence for optimal coupling into the waveguide. The optical fiber with a lens at the tip can emit a collimated beam toward the trailing edge of the slider where the transducer is located. For example, Corning Optifocus™ fibers can emit collimated beams with typical diameters of 62 μm. To receive light from the optical fiber, the transducer on the slider can also be designed to have a diffraction grating etched into the top end of the waveguide. If the period and depth of the grating are properly chosen, then a collimated beam incident upon the grating at the angle shown in FIG. 5 will be efficiently coupled into the waveguide. For example, for a waveguide comprised of a 100 nm $Ta_2O_5$ core on top of an $SiO_2$ cladding layer with air on the outside of the core, and light with a wavelength of 633 nm and TE polarization, the angle of incidence as a function of grating period is shown in FIG. 5.

Figure 6:
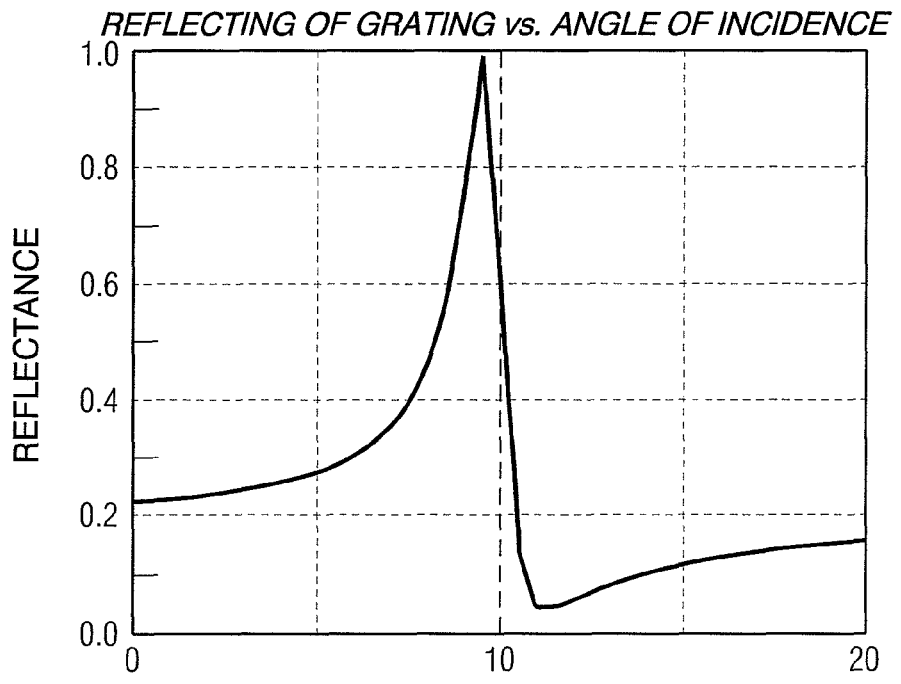
FIG. 6 is a graph of reflectance versus angle of incidence.

FIG. 6 is a graph of the reflectance versus angle of incidence for the grating coupler. If the angle of incidence onto the grating is 10°, then for the previous example waveguide, a grating with a period of 432 nm is needed to excite the lowest order TE waveguide mode. FIG. 6 shows the calculated reflectance of a 50 nm deep grating in this waveguide. FIG. 6 shows the effect of the resonant coupling of light into the waveguide at the desired angle. Thus for effective light delivery to the disc, the fiber needs to be in good alignment with the slider.

FIG. 7 is an isometric view of the bottom side of a suspension arm 120 and slider 122 constructed in accordance with this invention. The suspension arm includes a load beam 124 that supports a flex circuit 126 and the slider. The flex circuit 126 includes a first sheet 128 of, for example polyimide material, that supports conductors 130 and 132, and a second sheet 134 of, for example polyimide material, that supports conductors 136 and 138. The conductors 130, 132, 136 and 138 can be mounted on the surface of the sheets 128 and 134. An optical fiber 140 is positioned between the flex circuit sheets, and is supported by the suspension arm. An alignment block 142 is provided near the end of the optical fiber to properly position the end of the fiber so that it directs light onto the optical transducer at the correct angle. The alignment block is connected to the load beam 124 and can include a groove for accepting the optical fiber to prevent lateral movement of the fiber. A gimbal assembly 144 couples the slider to the load beam.

A load/unload tab 146 is provided at the end of the arm. The load/unload tab can be used in combination with other well-known structures such as a load/unload ramp to prevent contact of the slider with the disc when the disc is stopped. If the slider were allowed to contact the disc during startup, the suspension arm would be subject to buckling forces due to friction effects caused by reverse spinning of the disc. By including a load/unload tab, the buckling forces are avoided. If the load/unload tab is not used, the arm can be made strong enough to withstand the buckling forces.

One possible assembly for mounting the optical fiber includes alignment tabs (or indentations) on the suspension with the fiber being glued directly along these tabs. Another assembly, as illustrated in FIG. 7, attaches the fiber to a small block that is subsequently glued onto the suspension. The use of a mounting block complies well with existing head gimbal assembly (HGA) procedures since a deep or sloped indentation is not required to be created on the suspension.

FIG. 8 is an end view of the alignment block 142 showing the optical fiber 140 in a groove 148. The optical fiber can be secured in the groove by glue and the alignment block can be attached to the suspension arm using glue or other attachment means. The alignment block is connected directly to the load beam and the flex on suspension (FOS) is split into left and right sections that are positioned on opposite sides of the fiber. Alignment fiducials can be provided to align the fiber block unit with the suspension load beam.

An alignment aid such as a V-groove can be used to attach the fiber precisely to the block. The block thickness can be chosen to provide the needed angle of incidence of the light onto the optical grating on the slider. Precision mounting of the fiber mounting block unit can be achieved using optical component manufacturing technology and would not complicate suspension fabrication or the gimbal assembly process.

FIG. 9 shows an alternative means for supporting the optical fiber near its end by using a tab 150 extending from the suspension arm. The tab can also include a groove 152 for accepting the optical fiber 140.

In alternative structures, the optical fiber can be mounted on the flex circuit sheet or embedded therein. The sheet material can be partially etched along the load beam to create an alignment groove (indentation) to which the fiber block can be attached. Such grooves are compatible with typical suspension fabrication process.

FIG. 10 is a top view of a slider 122 and a portion of a flex circuit 126. The flex circuit includes sheets 128 and 134 that support conductors 130, 132, 136 and 138. An optical fiber 140 is positioned along the center of the flex circuit and supported near one end by a mounting block 142. Connection points 154 are provided to connect the conductors to the magnetic recording head mounted on the slider, in accordance with known techniques. The examples described above provide a basic approach to deliver light to a slider through an optical fiber by reversing the orientation of the slider by 180 degrees. Through the use of an alignment block (with precise alignment to the fiber) and/or an alignment groove or other alignment structure on the suspension, precise position and angular alignment (to a very small fraction of a degree) can be established between the fiber and the suspension load beam (to which the fiber alignment block is attached).

However, precise alignment between the fiber and the suspension load beam does not guarantee alignment between the fiber and the optical grating on the slider. In particular, the pitch angular tolerance of the load beam with respect to the slider or the recording disc can be ±1 degree due to a number of manufacturing tolerance limits such as suspension preload bending, head-stack assembly, and the media and spindle assembly. For example, variation in the height of the suspension base plate with respect to the recording disc (the z-height) will cause the suspension to bend, resulting a different load beam angle, and thus a different fiber angle.

Furthermore, this misalignment cannot be accounted for prior to the drive assembly process. Unless tolerances of all the drive subcomponents are substantially reduced, additional design features or angular adjustment of the fiber during the drive assembly process are needed in order to achieve the final angular tolerance between the fiber and the slider grating (±0.1 deg).

Figure 11:
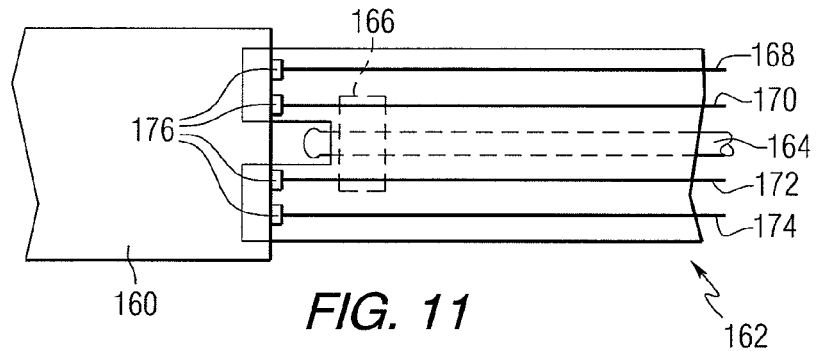
FIG. 11 is a top view of a slider and a portion of another flex on suspension.

While the alignment block of the fiber as described above will point the fiber without stress toward the slider grating with some finite accuracy, further accuracy can be achieved by attaching the tip of the fiber to the end section of the FOS which is bonded directly to the slider bond pads. FIG. 11 is a top view of a slider 160 and a portion of a flex on suspension 162 wherein the optical fiber 164 is mounted on a block 166 that is connected to an end of the FOS. The FOS includes a sheet of material that supports conductors 168, 170, 172 and 174. Connection pads 176 are used to connect the conductors to the recording head. The end section of the FOS will naturally be rigid and aligned with the slider. Thus the fiber will be aligned with similar accuracy. Alternatively, the tip of the fiber (with the ball lens) can simply be glued to the FOS or potentially the fiber can be integrated into the FOS to eliminate this assembly step (and the use of the alignment block). This approach could eliminate the need for pitch angle adjustment during drive assembly and provides a manufacturable solution.

Other examples provide for aligning the tip of the fiber to the top surface of the recording disc. The top surface of the recording disc has a well-defined angular relationship with the optical grating on the trailing edge of the slider (as governed by the flying dynamics of the air bearing). Therefore, to align the fiber to the grating of the recording slider, the tip of the fiber can be attached to a reference object, which is also flying on the surface of the disc.

Figure 12:
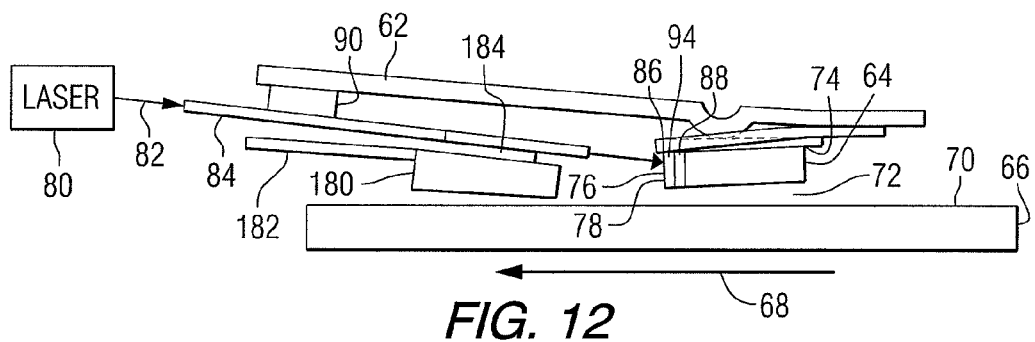
FIG. 12 is a schematic representation of another slider and a portion of a suspension arm constructed in accordance with this invention.

FIG. 12 is a schematic representation of another slider and a portion of a suspension arm constructed in accordance with this invention. Many of the components of FIG. 12 are the same as the components of FIG. 3 and carry like reference numbers. In the example of FIG. 12, the reference object takes the form of a reference slider 180 that is connected to a separate suspension arm 182 and connected to the optical fiber 84 by a block 184, or a suitable gimbal structure.

This reference object may be a simple plate or bar structure attached to the tip of the rotary actuator assembly driven by the voice-coil magnet so that the actuator, the reference object, and the slider (which is connected to the actuator through the suspension) will all move in synchrony. Unlike the slider, which requires a precise fly height and cross-track position, this reference object can have large tolerances as long as its relative position to the slider is within the tolerance of the fiber with respect to the optical grating.

This configuration enables the fiber to stay pointed towards the slider regardless of many assembly variations, since the fiber is now aligned to the slider via the top surface of the recording disc through the flying reference object. No pitch angle adjustment would be needed. Furthermore, in this case the fiber is connected to the reference object and is not directly connected to the slider. Therefore, the fiber doesn't directly impact the slider's dynamic performance.

Figure 13:
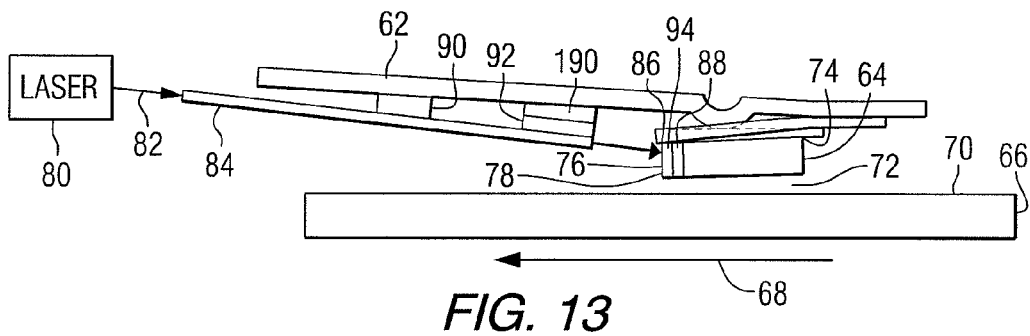
FIG. 13 is a schematic representation of another slider and a portion of a suspension arm constructed in accordance with this invention.
Figure 14:
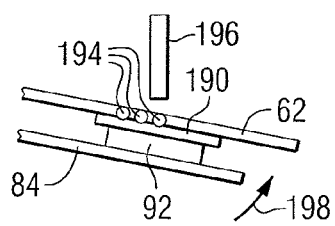
FIG. 14 is a side view of another structure for supporting an optical fiber.

Another approach for aligning the fiber uses an angular adjustment via metal deformation through laser heating. FIG. 13 is a schematic representation of a slider and a portion of an optical fiber constructed in accordance with this approach. Many of the components of FIG. 13 are the same as the components of FIG. 3 and carry like reference numbers. FIG. 14 is an enlarged view of the structure for supporting an optical fiber in the example of FIG. 13. The mounting block 92 is connected to another block 190 that is connected to the arm 62 by one or more welds 194. A laser 196 can be used to produce the welds. The welds deform the mounting structure so that the position of the end of the optical fiber can be moved as illustrated by arrow 198. The number, size, and position of the welds can be controlled to adjust the position of the end of the optical fiber.

The aggregate angular misalignment cannot be precisely known until the slider is loaded on the recording disc. The magnitude of the offset or the direction of improvement can be estimated or determined by applying light to the grating through the fiber and observing the reflected light from the media. Therefore, fine angular correction of the optical coupling between the optical fiber and the grating can be achieved through iterations of slider head gimbal assembly (HGA) load, optical feedback through the fiber, HGA unload, and adjustment of the position of the optical fiber end. Thus the alignment of the optical fiber and the optical transducer can be adjusted in response to light reflected from a storage medium.

The angular adjustment must not require the disassembly of the HGA drive assembly since each new assembly may introduce new offsets, effectively voiding the most recent adjustment. Therefore, the adjustment must be done at the drive level. While the misalignment "error" signal is available only when the HGA is loaded and the slider is flying, it is best to perform the adjustment when the HGA is unloaded, and preferably parked to the side. In this case, the adjustment process will not impose any risk of slider head crashing. Away from the media, the HGA also becomes more accessible.

The use of robot arms can theoretically accomplish the task. Robotic tweezers can apply a small twist and bend to the fiber alignment block to modify its relative angle with respect to the slider. In practice, this approach is not feasible without the expensive development of precision micro-robotic arms. Furthermore, this approach is likely limited to single-disc, single-arm drives.

The angle adjustment can be accomplished by applying heat to the joints, flexures, or block which may be supporting the fiber that is roughly aligned to the grating. Through the application of heat, the joints, flexures, or block deforms or misaligns slightly, leading to an increasing optical coupling power between the optical fiber and grating. This heating process must generate negligible particles in order to preserve the cleanliness of the head-to-media interface. Heat ideally should be applied only to small regions in order to avoid undesirable thermal effects in the drive.

Heat can be applied through a laser beam. Through the iterative process described earlier, adding welding spots between the fiber alignment block and the load beam to which the alignment block is attached can modify the angle of the fiber. The fiber may be initially biased so that by adding welding spots the fiber monotonically moves toward the ideal position. Alternatively, a mechanical support which can be plastically deformed through heat can be used to position the end of the fiber. The support can be made of two (or multiple beams) acting in tension. Using heat, it is possible to deform the shape or alter the stiffness of one beam, thus changing the angle of the fiber.

Figure 15:
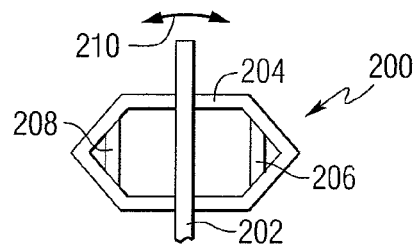
FIG. 15 is a side view of another structure for supporting an optical fiber.

Another approach to angular adjustment of the optical fiber tip uses metal deformation through electrical current heating. FIG. 15 is a mounting structure 200 that can be used to mount an optical fiber 202 to the arm. The mounting structure includes a frame 204 that includes two deformable struts 206 and 208. An electric current can be passed through the struts, thereby heating and deforming the struts and moving the tip of the optical fiber as illustrated by arrow 210.

Similar to the approach described above, heat is used for deformation. However, in this case, the heat is generated by applying a current to the head gimbal assembly (HGA). This current could theoretically be applied through the FOS. But extra wires on the FOS may compromise the dynamic response of the HGA, especially since advanced read-writer heads already require the traditional four or five wires on a FOS.

Figure 16:
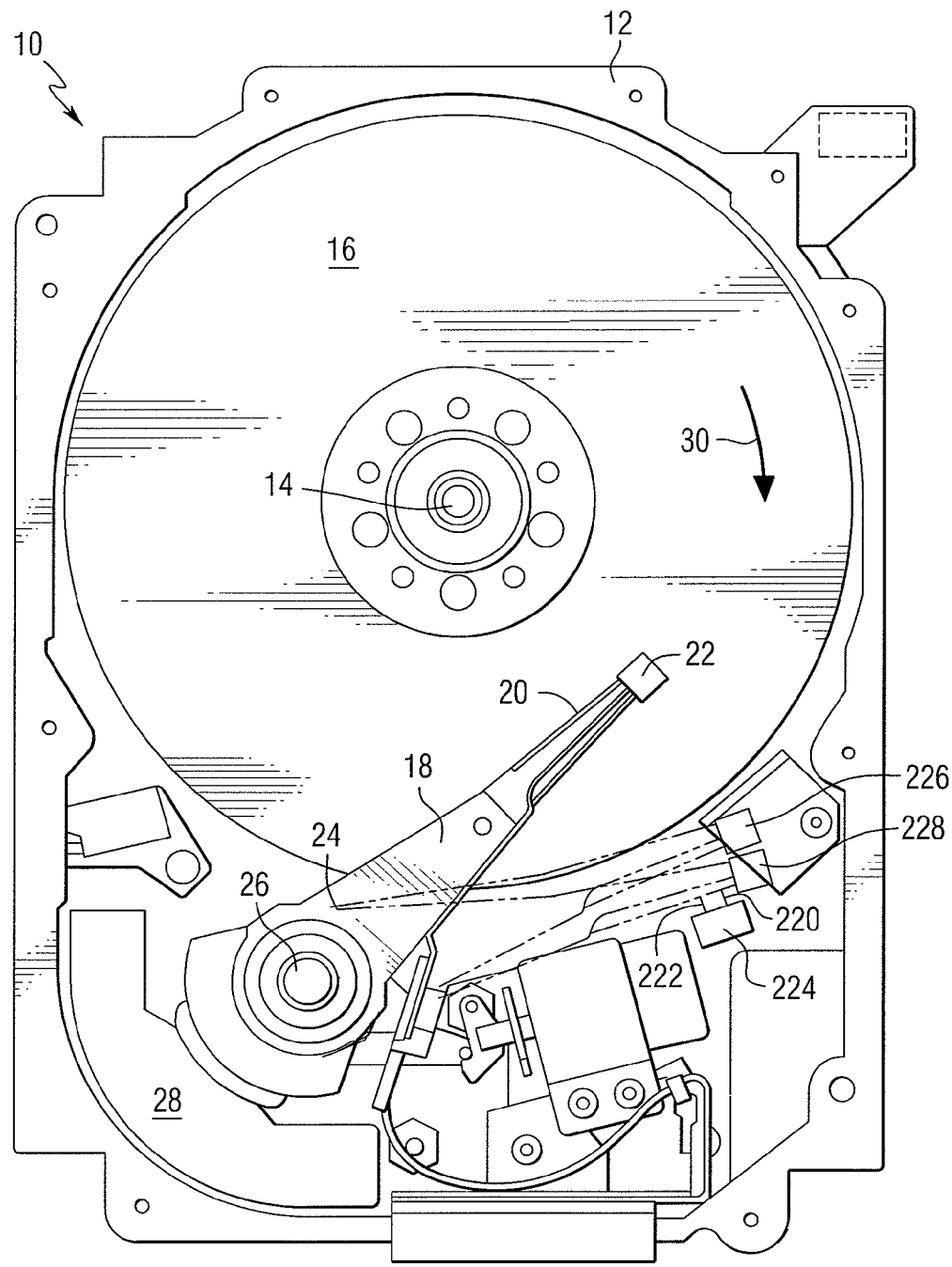
FIG. 16 is a pictorial representation of a magnetic disc drive constructed in accordance with this invention.

To avoid the need for additional wires on the FOS, the current can be applied through contact leads on the side of the drive. To access these contacts, the actuator motor moves the suspension arm to a position past the docking position of the arm. FIG. 16 is a pictorial representation of a magnetic disc drive that can include a suspension arm constructed in accordance with this invention. Contacts 220 and 222 are mounted on a block 224 near the side of the disc drive. The slider is capable of being positioned in a storage position 226 or in an adjustment position 228. In the adjustment position, the contacts supply current to the mounting structure. The current can be used to heat and deform the mounting structure to adjust the position of the tip of the optical fiber. Then the arm is returned to a position over the disc for further calibration.

The HGA may be made of multiple layers, some of which are electrically insulated. This is possible using current trace suspension assembly (TSA) technology. The applied current can generate heat in a region through a high resistance current path. The heat may either deform the current layer or another adjacent layer, plastically unbalancing the mechanical stress of the structure supporting the fiber as described earlier, thus adjusting the fiber angle.

With this approach, no special mechanism is needed for angle adjustment in the drive assembly process because the drive actuation motor is used. Minimal hardware modification inside the drive is required except for adding two electrical contact points beyond the normal docking position of the suspension arm. However, no hole or special access points must be created. Most importantly, the approach is suitable for not only single-disc, single-head drives but also for multi-disc, multi-head drives.

This invention simplifies the optical path in an optical or magneto-optical disc drive by reversing the direction of disc rotation and mounting an optical fiber on the suspension arm. No bending of the fiber is needed. The fiber can be designed to have a lens on its tip so that it emits a collimated beam at the edge of the slider where the transducer is located. The fiber can be mounted along the center of the suspension load beam to ensure that there is no asymmetrical stiffness contribution to the suspension and gimbal modes.

To implement the reversed slider-direction approach, the disc would need to spin in the opposite direction compared to a typical disc drive, since typical sliders have transducers which are located at the trailing edge of the air bearing. During startup when the slider is in contact with the disc, this can subject the suspension to compressive forces. At the stationary flat position of the slider, the frictional forces between the slider and disc could cause the gimbal to buckle under compressive start-up forces due to friction. This can be overcome by designing the gimbal to withstand these forces. To avoid compressive forces on the suspension at start-up, the suspension could be a load-unload type where the slider is unloaded from the disc onto a ramp and so does not land on the disc.

For the slider orientation shown in the examples, it is most convenient to route the flex circuit under the load beam. Typical bonding technology may be used to attach the flex on suspension (FOS) to the bond pads on the trailing edge of the slider. To maximize the area for the optical grating, the bond pads would ideally be located at the topside of the slider. In that case, the slider must be mounted such that the bond pads are exposed for flex connection. In addition, the glue thickness on the gimbal tongue can be controlled so that the slider is attached at a slightly lower plane compared to the plane of the flex on suspension.

While the examples described above relate to heat assisted magnetic recording, wherein a transducer is used to heat a portion of the storage medium and the heated portion of the storage medium is subjected to a magnetic field to affect the magnetization of a storage layer in the storage medium, this invention can be used in other systems. For example, the invention can be applied to optical recording systems, or any other systems wherein an optical transducer is mounted on an arm. The invention can also be used in optical lithography systems or in other systems that perform optical operations such as scribing or cutting.

While the invention has been described in terms of several examples, it will be apparent to those skilled in the art that various changes can be made to the disclosed examples, without departing from the scope of the invention as set forth in the following claims.

What is claimed is:

1. An apparatus comprising:
    a load beam;
    a slider coupled to the load beam by a gimbal assembly and including an optical transducer;
    an optical fiber; and
    a mounting structure connected to the optical fiber and positioning an end of the optical fiber such that light is transmitted from the optical fiber directly toward the optical transducer.

2. The apparatus of claim 1, wherein the mounting structure includes one or more welds.

3. The apparatus of claim 1, wherein the mounting structure includes one or more deformable struts.

4. The apparatus of claim 1, wherein the optical transducer includes a planar waveguide and a grating for coupling light from the optical fiber to the planar waveguide.

5. The apparatus of claim 1, wherein the mounting structure includes a reference object for positioning an end of the optical fiber.

6. The apparatus of claim 5, wherein the reference object comprises:
    a second slider coupled to the optical fiber.

7. The apparatus of claim 1, further comprising:
    first and second contacts for applying an electric current to the mounting structure.

8. The apparatus of claim 1, further comprising:
    a laser for heating the mounting structure.

9. The apparatus of claim 1, wherein the optical fiber is mounted along a center of the load beam.

10. The apparatus of claim 1, further comprising a mounting block connected to the load beam, wherein the optical fiber is mounted to the mounting block.

11. The apparatus of claim 1, further comprising a flex on suspension including a planar sheet mounted on the load beam, wherein the optical fiber is mounted to the planar sheet.

12. The apparatus of claim 1, further comprising a flex on suspension including first and second planar sheets mounted on the load beam on opposite sides of the optical fiber.

13. An apparatus comprising:
    a motor for rotating a storage medium;
    a suspension arm including a load beam for positioning an optical transducer adjacent to a surface of the storage medium;
    a slider coupled to the load beam by a gimbal assembly and including the optical transducer;
    an optical fiber; and
    a mounting structure connected to the optical fiber and positioning an end of the optical fiber such that light is transmitted from the optical fiber directly toward the optical transducer.

14. The apparatus of claim 13, wherein the mounting structure includes one or more welds.

15. The apparatus of claim 13, wherein the mounting structure includes one or more deformable struts.

16. The apparatus of claim 13, wherein the optical transducer includes a planar waveguide and a grating for coupling light from the optical fiber to the planar waveguide.

17. The apparatus of claim 13, wherein the mounting structure includes a reference object for positioning the end of the optical fiber.

18. The apparatus of claim 17, wherein the reference object comprises:
    a second slider coupled to the optical fiber.

19. The apparatus of claim 13, further comprising:
    first and second contacts for applying an electric current to the mounting structure.

20. The apparatus of claim 13, further comprising:
    a laser for heating the mounting structure.

* * * * *